May 29, 1962   E. S. FABISZEWSKI   3,036,771
WEIGHT COUNT GENERATING CIRCUIT FOR DATA PROCESSING SYSTEMS
Filed Aug. 28, 1958   5 Sheets-Sheet 2

INVENTOR:
Edward S. Fabiszewski,
BY Bair, Freeman & Molinare
ATTORNEYS.

May 29, 1962 — E. S. FABISZEWSKI — 3,036,771
WEIGHT COUNT GENERATING CIRCUIT FOR DATA PROCESSING SYSTEMS
Filed Aug. 28, 1958 — 5 Sheets-Sheet 3
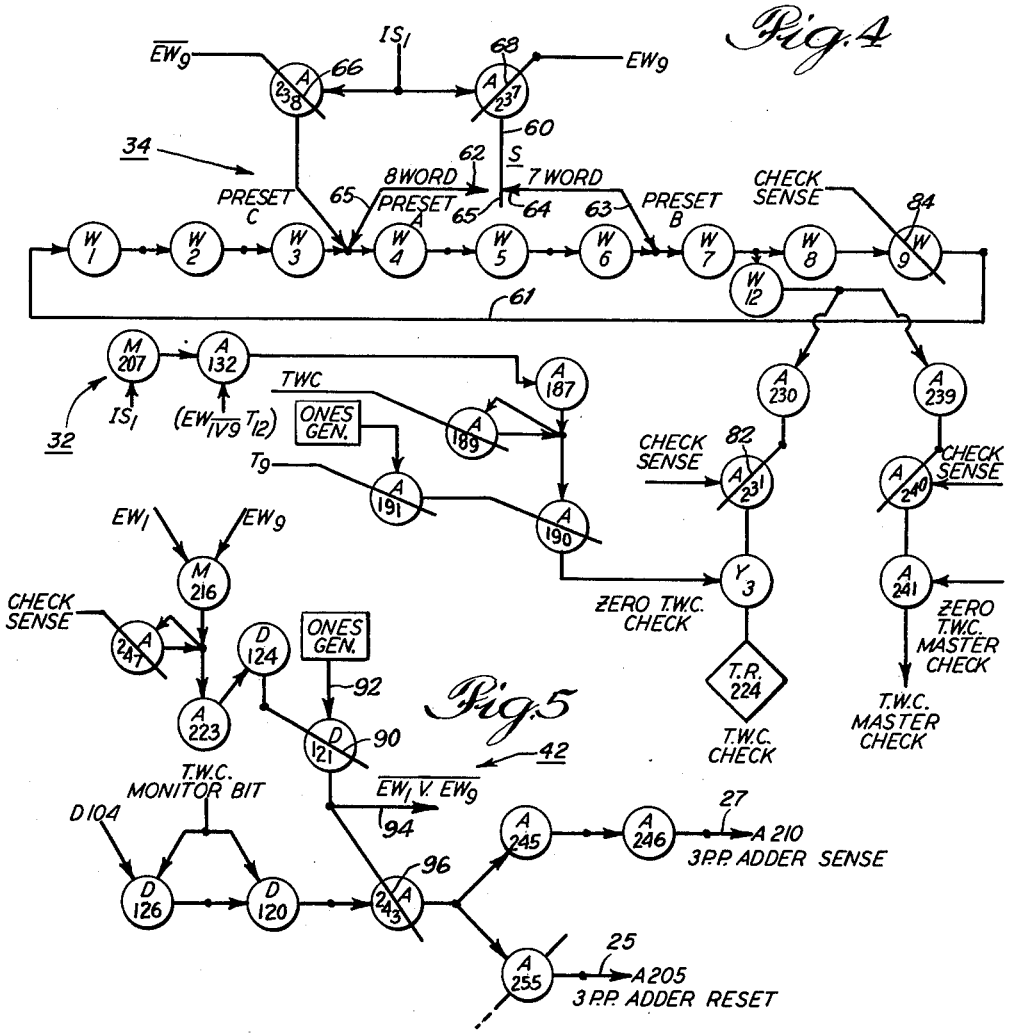
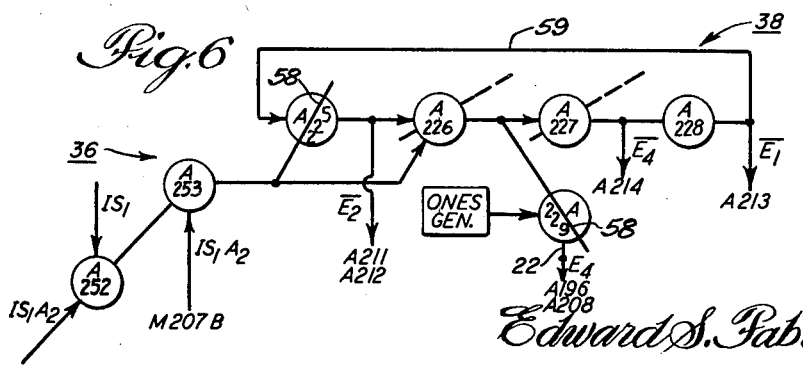
INVENTOR:
Edward S. Fabiszewski,
BY Bair, Freeman & Molinare
ATTORNEYS.

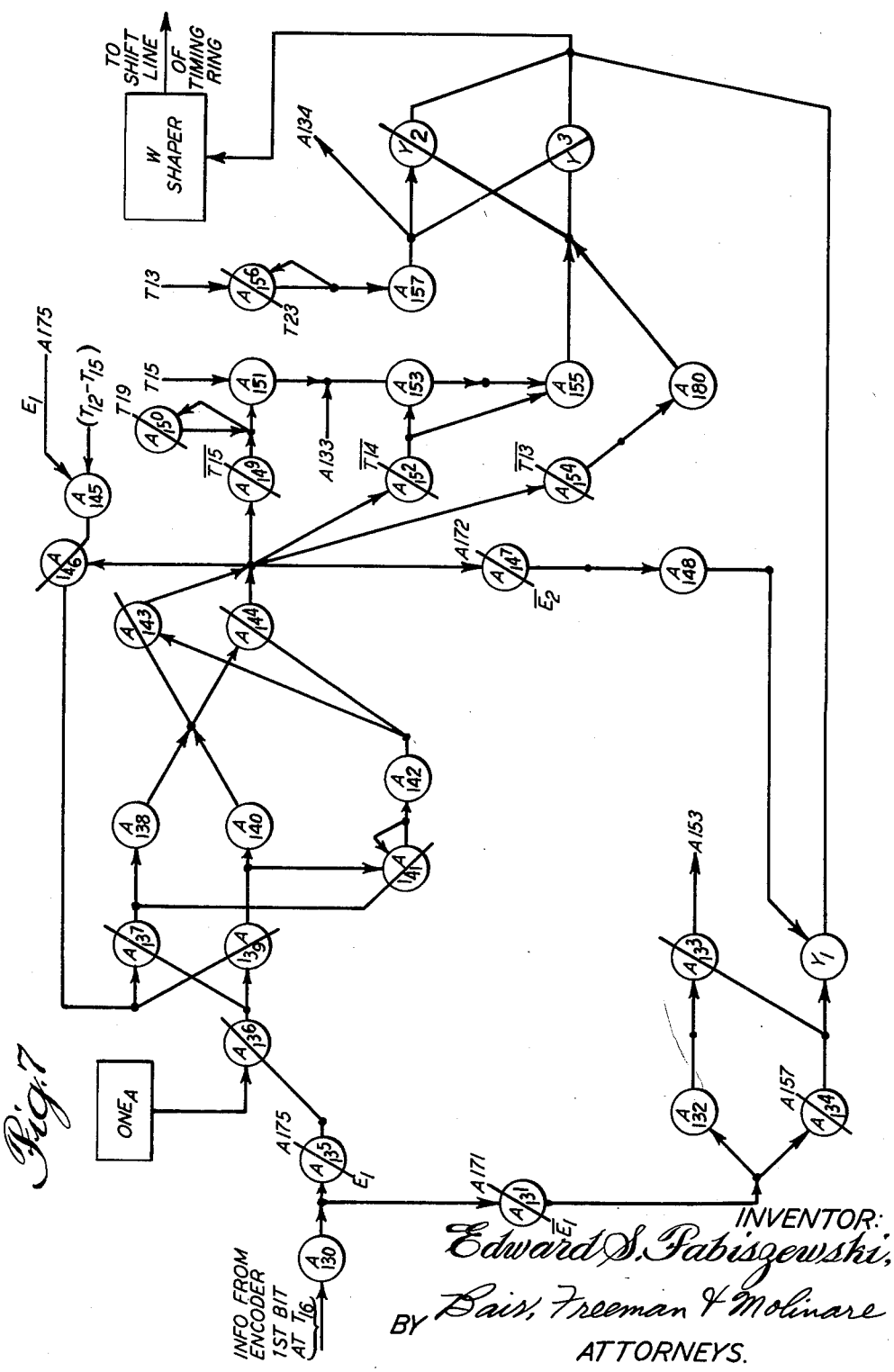

May 29, 1962  E. S. FABISZEWSKI  3,036,771
WEIGHT COUNT GENERATING CIRCUIT FOR DATA PROCESSING SYSTEMS
Filed Aug. 28, 1958  5 Sheets-Sheet 5
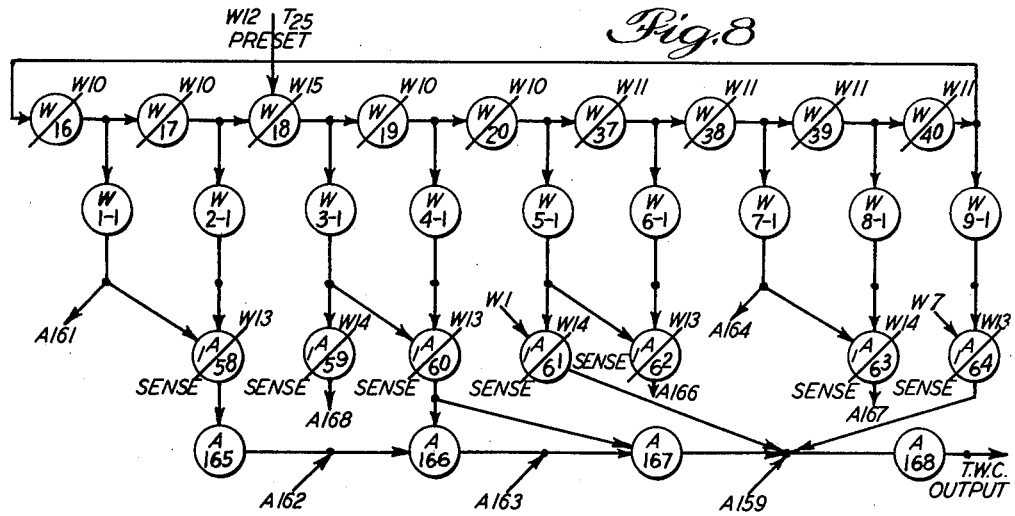
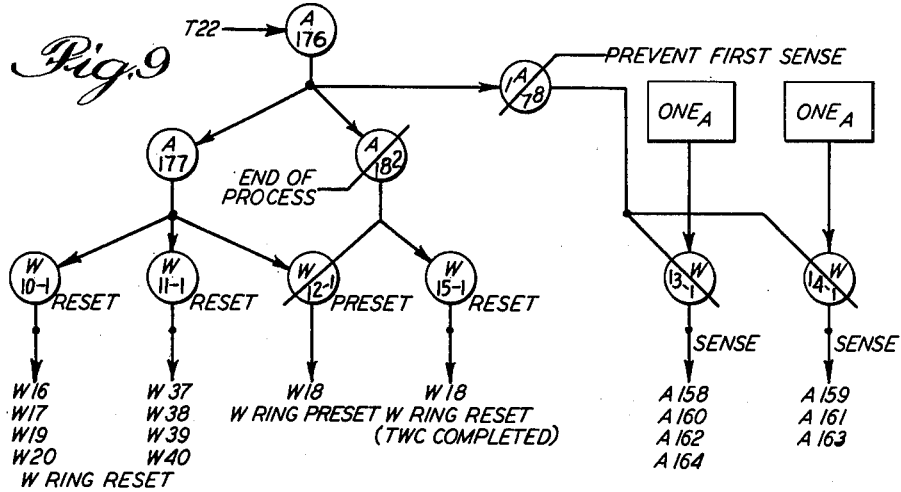
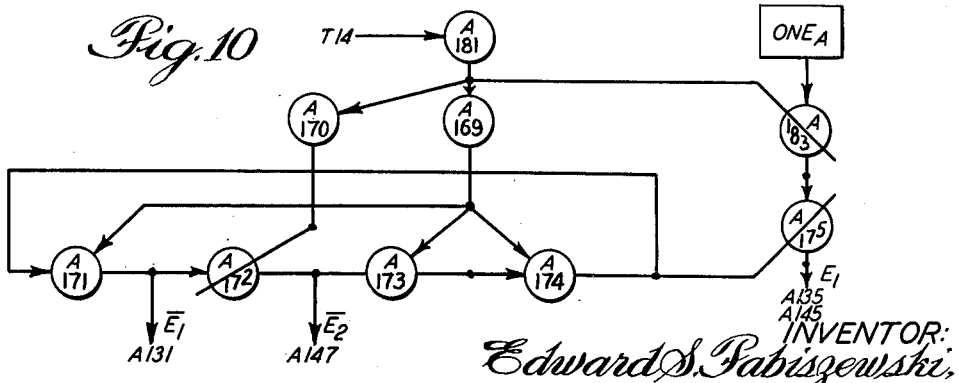
INVENTOR:
Edward S. Fabiszewski,
BY Bair, Freeman & Molinare
ATTORNEYS.

United States Patent Office 3,036,771
Patented May 29, 1962

3,036,771
WEIGHT COUNT GENERATING CIRCUIT FOR DATA PROCESSING SYSTEMS
Edward S. Fabiszewski, Lexington, Mass., assignor to Minneapolis-Honeywell Regulator Company, Minneapolis, Minn., a corporation of Delaware
Filed Aug. 28, 1958, Ser. No. 757,840
20 Claims. (Cl. 235—153)

This application relates generally to improvements in data processing apparatus and more particularly to new and improved weight count circuits for checking the operation of data processing apparatus.

In many of the electrical data processing machines known in the art, the information used to represent the data being processed and the information used for control purposes commonly appear in the form of groups of temporally spaced electrical pulses. These groups of electrical pulses, sometimes referred to as machine words, generally contain a predetermined number of pulses or bits. In most data processing machines, the bits in each of the machine words are formed by groups of 0's and 1's in some form of binary notation.

As the machine words are processed and transferred from one place to another in the machine, there exists the danger of a loss of information, or the provision of a pulse in the information at a place where it is not desired. One way of checking the accuracy of the processing of any particular set of information pulses is to append thereto a satellite number which is generated in accordance with the number and position of the pulses in the set. This satellite number frequently is referred to as the weight count. Thus, for the purposes of checking, the satellite number or weight count carried in the machine word is examined with respect to the information that is used or transferred.

A representative weight count checking circuit of the type discussed above is disclosed in the patent to R. M. Bloch, 2,634,052, issued April 7, 1953. As disclosed in this patent, if there is a failure in the machine to transfer information properly, the generated weight count will not agree with the satellite weight count and an error signal will be generated to indicate the machine failure.

In generating the weight count for an information word, it is convenient to assign different, arbitrarily chosen weights to the various columns of the word, and then to sum the weights of all columns in which the binary digit "one" appears. Further, it is convenient to reduce the number of digits in the weight count by modifying the latter in accordance with the rules of modulo addition, i.e., when the ones-bearing digits of the word are summed in accordance with their arbitrarily assigned weights, all columns of the sum in excess of a selected number are discarded. For example, if a weight count is to be a modulo, or mod, 9 weight count, and if the sum of the weighted bits of an information word is 38, the weight count would be 38 reduced mod 9 or 2. Thus, it can be seen in this example, that all numbers equal to 9 and the even multiples thereof have been discarded.

It is a general object of this invention to provide a new and improved circuit for generating a weight count in a data processing machine.

It is another object of this invention to provide a new and improved circuit for weight count checking of information transferred in a data processing machine.

It is still another and more specific object of this invention to provide novel weight count circuitry which is adapted to operate with a modulo different from the modulo of the weight count carried with the information transferred in the data processing machine.

It is a further object of this invention to provide a novel transfer weight count circuit, as described above, in which a predetermined number of sequential signals are produced by the processing of a single bit in the circuit.

It is a still further object of this invention to provide a novel transfer weight count circuit in which a predetermined number of sequential signals are produced, as described above, and then related to the presence or absence of an error in the operation of the circuit.

It is a still further object of this invention to provide a new and improved transfer weight count circuit for a data processing machine that is characterized by its efficiency, its accuracy, and its flexibility.

These and other objects are realized in accordance with one specific illustrative embodiment of the invention wherein the weight count check of the information transferred within the data processing machine involves adding the values of each bit transferred and producing an output check signal indication of the presence or absence of an error in the information transferred.

For the purpose of illustrating the principles of the invention, it will be assumed that the information is transferred from a suitable source, such as a magnetic tape, to an input register which in turn, forwards the information to the transfer weight count circuit of the invention and to an output register where the information is ready for further processing. It further will be assumed, in the illustrative example, that the information arriving at the input register from the magnetic tape will be in the form of machine words of fifty-two bits in length in which forty-eight of the bits are information bits and the remaining four bits are weight count bits. To illustrate the flexibility of the invention, the weight count circuit will be adapted to check the information from processing cycles of either 7 or 8 words each, and will produce a weight count check only after the completion of the processing cycle. Thus, when the processing cycle is a 7 word cycle for example, the information checked in the weight count circuits will comprise the entire 7 words in terms of the weight count of each of the words and the total weight bit evaluation of all of the information bits in the 7 words.

It is a feature of this invention that the weight count circuit operates with a modulo different from the modulo of the weight count carried with the transferred information and this feature will be illustrated by assuming that the weight count transferred with the information is in modulo, or mod 9 and that the weight count circuit produces a weight count by reducing the information mod 8. Thus, in accordance with aspects of the invention, the transfer weight count circuit comprises means for casting out or killing certain bits to produce a checking signal in accordance with a modulo other than that of the weight count normally associated with the information transferred.

As the explanation of the invention proceeds below, it will become apparent to those skilled in the art that the specific features of the illustrative embodiment merely are exemplary of the principles of the invention and that these principles may be applied with equally advantageous results to systems operating with other modulo reductions. The salient concept underlying any such system in which the invention is utilized is that the number of castings out, or kills, of the modulo bits in the words, must be kept track of and related to the original base of the information weight count.

In accordance with the above-recited considerations, one of the specific illustrative embodiments of the invention disclosed herein comprises a transfer weight count adder which receives each machine word, formed of a plurality of information bits and a weight count reduced modulo 9, after it has been transferred to an input register from a suitable source such as a magnetic tape. Advantageously, before each word is applied to the transfer weight count adder, the weight count carried with the word is processed through a complementing circuit where its fifteens complement is obtained, if it was not already in complemented form. Subsequently, the fifteens complement of the weight count is passed through an inhibiting circuit which is rendered operative every fourth pulse period to the end that any eights therein, i.e., any bit in the $2^3$ pulse position, is killed or cast out. Thus, in each machine word, the weight count is manipulated as its fifteens complement and the eights are cast out before the weight count is fed into the adder. The information bits in the word are fed into the adder in the non-complemented form but with the eights or bits in the $2^3$ pulse positions cast out in the same manner as the $2^3$ bits in the weight count.

The information at the output of the adder is reduced mod 8 by an inhibit circuit which casts out all bits in the $2^3$ position of the output. In this manner, the adder circuit accumulates the weight of the information bits and the complemented weight count bits at its input with the adder sum being reduced mod 8. Each time an eight is killed, a pulse indicating this event is fed to an adder-to-counter converter at one of two input terminals—one such terminal having an input in accordance with the eight kills at the adder input and the other terminal having an input in accordance with the eight kills at the adder output.

The resultant summation at the adder output is converted to its sevens complement, which is the correction factor in converting from mod 9 to mod 8, and this is added to a count representative of all of the eights cast out or killed to derive a series of shift pulse signals.

In accordance with the invention, if the transfer of the machine word is without error, the shift pulse signals will equal a pre-determined number for each given processing cycle. Thus, in the instant illustrative example, if no error is present in a seven word processing cycle, the number of shifts produced, reduced mod 9 will be one, and if no error is present in an 8 word processing cycle, the number of shifts produced will be four. If, in the checking of the machine word transfer, an error is detected, a thyratron relay is fired to indicate this error and the data processing machine is automatically stopped, at the end of the cycle.

The above and other features of novelty which characterize the invention are pointed out with particularity in the claims appended to and forming a part of this specification. For a better understanding of the invention, its advantages and specific objects attained by its use, reference is had to the accompanying drawing and descriptive matter in which is shown and described an illustrative embodiment of the invention.

In the drawing:

FIGURE 4 is a logical schematic diagram of a transfer weight count counter circuit which advantageously may be used in the system of FIGURE 1;

FIGURE 5 is a logical schematic diagram of an adder sense circuit which advantageously may be used with the system of FIGURE 1;

FIGURE 6 is a logical schematic diagram of a timer circuit suitable for use in the system shown in FIGURE 1;

FIGURE 7 is a logical schematic diagram of a circuit adapted to generate the timing or shift pulses used for generating a weight count of the information applied to its input in accordance with another embodiment of the invention;

FIGURE 8 is a logical schematic diagram of the timing and conversion circuit used to convert the adder remainder and the modulo reduction kills into a binary coded decimal number representative of the weight count of the information applied to the input of the circuit of FIGURE 7;

FIGURE 9 is a logical schematic diagram of the circuitry used for supplying the set and reset signals for the conversion circuit of FIGURE 8; and FIGURE 10 is a logical schematic diagram of a circuit embodiment adapted to supply the control signals for the adder circuit of FIGURE 7.

Figure 1:
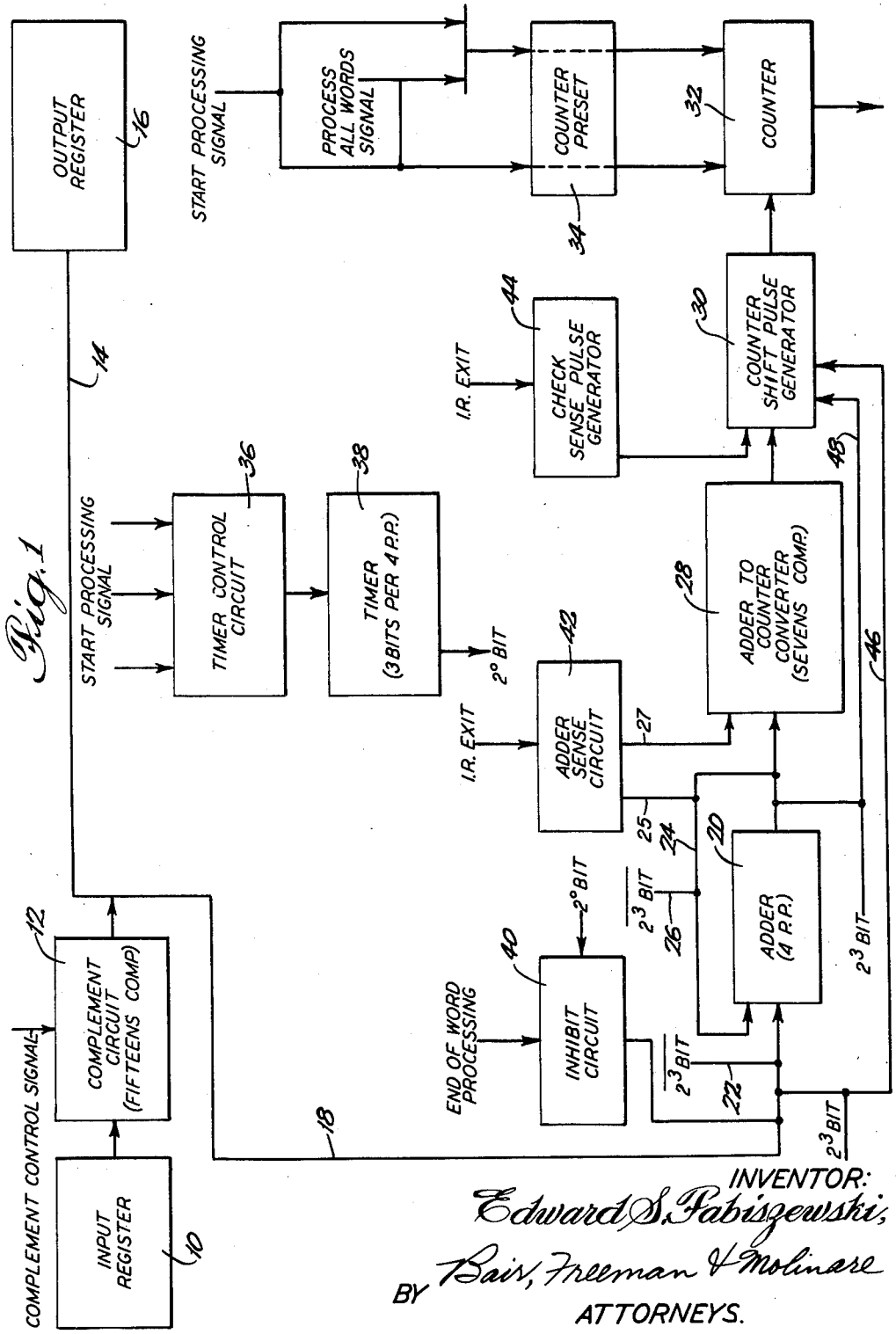
FIGURE 1 is a block diagram of an illustrative transfer weight count system for checking operations in a data processing machine which embodies principles of the invention.

Referring now to the drawing, and more particularly to FIGURE 1, there is shown in block diagram form a transfer weight count system embodying the present invention. This weight count circuit advantageously may be used for checking the processing of information in data processing systems such as computers, telemetering systems, and the like. In the illustrative example described in the present specification, the weight count circuit will be disclosed as checking information transferred from a suitable source, such as a magnetic tape, to an input register which, in turn, transfers the information to an output register such as with further magnetic tape, a printer, a punch or the like. The weight count circuit is adapted to check the information transferred in each processing cycle and to produce a weight count check only after completion of the processing cycle.

It will be understood by those skilled in the art that this processing cycle may have a length of any selected number of machine words and for purposes of illustration, the weight count circuit will be disclosed as producing a check after the completion of processing cycles of either 7 words or 8 words in length. Accordingly, in a 7 word processing cycle for example, the information checked in the weight count circuit will comprise the entire 7 words in terms of the weight count of each of the words and the total weight bit evaluation of all of the information bits of the words. It is a very important feature of this invention, as described in greater detail below, that the weight count circuit is adapted to operate with a modulo different from the modulo of the weight count carried with the information bits received by the input register.

As shown in FIGURE 1, the weight count system comprises an input register 10 which receives digit words during the transfer operation. In this example, it will be assumed that each machine word comprises a plurality of forty-eight information bits and four weight count bits representing the sum of the information bits in accordance with a prescribed column weighting scheme and reduced modulo 9.

The information in the input register 10 is transmitted therefrom in serial form and in addition to including the aforementioned fifty-two bits, includes additional control bits used in the processing. Thus, the first word fed from the input register will have preceding the same a signal probe sometimes referred to as a lead sentinel. This lead sentinel is sensed by circuitry, not shown, which produces an initial set signal $IS_1$. Further, after each machine word is transferred from the input register, that is after each 48 information bits, the circuitry may be arranged so that an end word signal EW is produced to indicate that the particular word has been transmitted from the input register. These end word signals EW are identified in the description that follows in accordance with the particular word with which the end word signal is associated.

In one particular embodiment of the invention, the input register was designed to hold eight machine words and these words are transmitted from the input register with the high order word being transferred first. The input register is generally loaded from an appropriate magnetic tape such that when information is first read from the tape the words stored in the input register will be machine words 9–16. The loading of the input register immediately after this first loading will be with machine words 1–8. Thus, the last word out of the input register when words 1–8 have been stored therein will be the word 1 and consequently, the end word signal produced will be an $EW_1$ signal. In connection with the words 9–16, the last word out of the input register will be word 9 and the signal representing this will be $EW_9$.

The words in input register 10 are fed through a complement circuit 12 where the weight count will appear on the output as its 15's complement, i.e., each weight count is converted to a number equal to the difference between the weight count and 15. For a word having all valid zeros in the information bits, the weight count is given an arbitrary value of 9, to distinguish the machine word from one having invalid zeros, and therefore, the 15's complement of such a word will be a 6. The information passed through the complementing circuit appears in the non-complemented form.

The output of the complement circuit 12 is fed over conductor 14 to an output register 16 for further processing and, in addition, this output is fed over conductor 18 to a transfer weight count adder 20. The transfer weight count adder 20 operates with modulo 8, i.e., in a number system in which all 8's have been cast out, and therefore, it is necessary to compensate for the difference between the modulo of the weight count of the machine words fed into the input register 10 and the modulo with which the transfer weight count circuit operates. This compensation is provided in part by a transfer weight counter inhibit line 22 at the input of adder 20 which casts out or kills the 8's from the 15's complement of the weight count at the output of complement circuit 12. When the machine words in the input register are in normal form, that is, it is not complemented, the complement circuit 12 complements only the weight count in each information word as the word is fed into the adder 20, and the remainder of the bits in each word, namely the information bits, are fed into the adder 20 without complementing. However, all of the 8's in the information bits are cast out or killed by the inhibit line 22 before these bits are fed into adder 20.

The transfer weight count adder 20 is a four pulse period adder and therefore, the bits in each machine word are fed into the adder 20 and are considered four bits at a time. Adder 20 has a feedback conductor 24 connected from its output to its input for enabling each group of four bits fed into the adder 20 to be added to the groups of bits previously fed into the adder. An inhibit line 26 is connected to the feedback conductor 24 of the transfer weight count adder 20 and causes all of the 8's present in the sum at the adder output to be cast out or killed before the sum is fed back into the input of the adder 20.

At the end of each time that the information is cleared from the input register, the output of adder 20 is fed into an adder-to-counter converter 28 which converts the adder output sum to its 7's complement, i.e., to a number equal to the difference between the adder output and the numeral 7. This 7's complementing of the adder output is an additional correction factor in converting the modulo 9 representation of the machine word weight count to the simulated modulo 9 representation of the transfer weight count system. The simulated modulo 9 check may also be considered as a modulo 8 check plus a correction factor which, even though a modulo 8 type operation is performed, retains the accuracy of a modulo 9 check.

The 7's complement of the adder output is applied to a counter shift pulse generator 30 which serves to provide a number of sequential signals or shift pulses for the transfer weight count counter 32. As the number of shift pulses provided by the counter shift pulse generator 30 is determined, in part, by a count representative of all of the 8's cast out or killed at the input and output of the adder 20, a conductor 46 is provided between the input of adder 20 and the counter shift pulse generator 30, and a conductor 48 is provided between the output of adder 20 and the counter shift pulse generator 30. In this manner, the number of shift pulses in the sequential series of signals produced by the counter shift pulse generator 30 is equal to the sum of the output of the adder-to-counter converter 28 and a number representative of the total number of 8's cast out at the adder 20.

This series of sequential shift pulses is fed to a counter 32 for shifting a bit in the counter a predetermined number of pulse positions which is a direct function of the information transferred each time the information is transferred without error in a processing cycle. In accordance with the invention, for a 7 word processing cycle, the number of shifts produced in the counter 32 reduced mod 9 will be one, and for an 8 word processing cycle the number of shifts produced in the counter 32 reduced mod 9 will be four.

A counter preset circuit 34 is connected to the counter 32 for placing the bit in the counter in a predetermined position according to the number of words in the processing cycle to the end that if the information words have been transferred without error, the bit in the counter will always come to rest after shifting at a predetermined position. Thus, if the bit in counter 32 is not shifted to this predetermined position at the end of the operation of the weight count circuit, an error is indicated and the operation is stopped.

The block diagram of FIGURE 1 additionally comprises a timer control circuit 36 and a timer 38. The latter is adapted to be connected to the transfer weight count inhibit circuit 40 for rendering the weight count circuit inactive during the time information is being fed into the input register 10. As soon as the transfer into the input register 10 is completed, the transfer weight count inhibit circuit 40 is deactivated to enable the information to be fed into the adder 20 from the input register 10 and the complement circuit 12.

The transfer weight count circuit of FIGURE 1 further comprises an adder sense circuit 42 which serves to sense the remainder in the adder 20 after the information has been processed through the adder. In addition, a transfer weight count check sense pulse generator 44 is provided in cooperative association with the counter shift pulse generator 30 for applying a check sense pulse to the latter when it is desired to check the transfer weight count. The details of each of the circuits shown in block diagram form in FIGURE 1 will be described below in connection with FIGURES 2 through 6 as the operation of the transfer weight count system is disclosed with greater particularity.

In the weight count logical circuits comprising the invention, it has been found advantageous to utilize bistable magnetic cores of the type having a rectangular hysteresis loop characteristic. Such cores are characterized by two stable states of operation and therefore, they readily lend themselves for use in logical circuitry employing binary notation. These magnetic cores have been shown in customary symbolic form in FIGURES 2 through 6, and generally comprise an input winding, an output winding, a shift winding and an inhibit winding, said inhibit winding when activated serving to prevent the switching of the core from one of the stable states to the other. A detailed discussion of this type of circuitry and various ways in which it may be implemented will be found in an article by S. Guterman et al., entitled "Logical and Control Functions Performed With Magnetic Cores," Proceedings of the IRE, March 1955.

Figure 2:
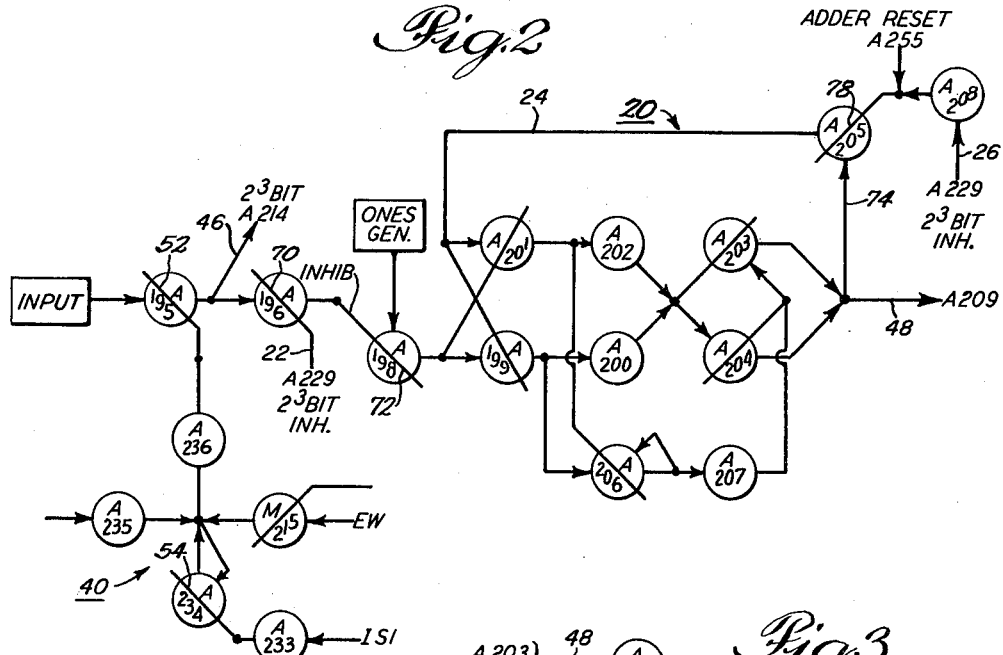
FIGURE 2 is a logical schematic diagram of a complement circuit and transfer weight count adder suitable for use in the system shown in FIGURE 1.

Referring now to FIGURE 2, it will be appreciated that during a tape transfer, when information is being read from the tape into the input register, it is desirable that the weight count adder circuit be made inactive. That is accomplished by a ones generator which includes a core A234 adapted to be set by a signal from the core A235, the latter providing a pulse to indicate that a tape transfer is under way. The output pulses from ones generator core A234 are fed through the core A236 to an inhibit winding 52 on input core A195. This blocks all information from coming into the adder circuit 20 from the input register.

As soon as the tape transfer is completed, processing of the information may be initiated. The signal to signify the processing of information in the transfer weight count circuit is denoted $IS_1$, and this $IS_1$ signal is applied to the core A233, and then is shifted to the inhibit or reset winding 54 of the core A234 to kill the ones generator. The killing of core A234 as a ones generator stops the production of pulses therefrom and results in the termination of the inhibit action on the input core A195 so that information may be transferred from the input register 10 and complement circuit 12 into the transfer weight count adder 20.

An additional circuit receiving the $IS_1$ signal is the transfer weight count timer 38, shown in FIGURE 6. Here the $IS_1$ signal is applied to the core A252 which shifts a pulse into core A253. The signal in core A253 is shifted out to core A226. At the same time, the $IS_1$ signal delayed two pulse periods is shifted into each of the cores A252 and A253. These pulses, in addition to being applied to core A226, are also shifted out to inhibit winding 58 of core 225 to kill the information previously circulating in the timer register through cores A225, A226, A227, A228 and feedback line 59.

These three pulses when fed into the core A226 set the timer core register of timer 38 so that there are three 1's and an 0 circulating therein. The signals for identifying the weighted values in accordance with the binary progression is available at the taps in the timer identified by the lines $\overline{E_1}$, $\overline{E_2}$ and $\overline{E_4}$, the $\overline{E_1}$ tap being connected at the output of the A228 core, the $\overline{E_2}$ tap being connected to the output of the A225 core, and the $\overline{E_4}$ tap being connected to the output of the A227 core.

The information in the register of timer 38 may be complemented, when desired, by observing the 1's pulses at the output of core A226 and utilizing these pulses to inhibit core A229 by energizing its inhibit winding 58. As core A229 has a ones generator connected to its input, the energization of its inhibit winding 58 serves to provide an output from core A229 equal to the complement of the information in the timer register, or in this case, three 0's and a 1.

The start processing signal $IS_1$ is also used to preset the transfer weight count counter 32, shown in FIGURE 4, by inserting a single 1's pulse or bit in the plural stage shift register comprising serially connected cores W1 through W9 and feedback line 61. The $IS_1$ signal is applied to the inputs of a pair of cores A237 and A238, the outputs of which are connected respectively to the armature 60 of a relay switch S and to the input of core W4. Relay switch S has a pair of stationary contacts 62 and 64, respectively, connected to the input of core W4 and to the input of core W7.

The core position in the plural stage shift register of counter 32 where the $IS_1$ bit will be inserted is dependent upon the number of words processed in the cycle. Normally, the contacts of relay switch S are in the position shown—that is, with armature 60 connected to the contacts 64—so that the output of the core A237 is connected to the 7 word line 63 to place the bit into the core W7. If the relay switch S is switched to its other position with armature 60 contacting contact 62, the output of the core A237 is dropped over the 8 word line 65 into the core W4. In accordance with the illustrative embodiment of the invention, this is the case when an 8 word cycle is being processed.

When there are both seven and eight word combinations in the cycles being processed, as is normal for some types of data processing systems, the relay switch S will be as shown in FIGURE 4 and the first seven words transferred will be checked into the counter by the signal $IS_1$ coming in through the core A237 and line 63 to drop a bit into the core W7. This will take place because on the first seven word transfer, the signal identifying the end of word 9—$\overline{EW_9}$—will be applied to the inhibit winding 66 of core A238 to block this core, while at the same time core A237 will be open to enable a bit to be applied to the input of core W7. In the case of an eight word transfer, the signal $EW_9$ is present on the inhibit winding 68 of core A237 to block this core, and consequently the only bit available to the $IS_1$ signal will be through the core A238 to the input of core W4.

After the $IS_1$ signal has been applied to the input of the adder, the transfer weight count timer, and the shift register of the transfer weight count counter 32, to signify the start of processing as described above, the circuit is conditioned to receive information from the input register 10 and complement circuit 12. Since the input register and the complement circuit are well-known types of circuits in the computing art, and since the details thereof do not form a part of this invention, they have been shown in diagrammatic block form only and a specific discussion of their details is not necessary herein. As the information comes in through the input core A195 and is shifted out, all bits in the complemented weight count carrying the weight of 8, i.e., the bits in the $2^3$ position, will be killed in the core A196 by the inhibit signal, $2^3$ bit inhibit, applied to the inhibit winding 70 of the latter. Advantageously, this inhibit signal is derived from the core A229 in the transfer weight count timer shown in FIGURE 6. All of the outer bits in the weight count, i.e., the bits in the $2^0$, $2^1$, and $2^2$ bit positions, are fed into the inhibit winding 72 of core A198 where they are applied in complement form to the adder circuit 20. In addition, the information bits are fed to the inhibit winding 72 of core A198 after the 8's have been killed therein by the core A196. The adder circuit 20 accumulates the weight of the complement of the information bits and the weight count bits after the 8's have been killed, as described above.

Advantageously, in this embodiment of the invention, adder 20 comprises a plurality of cores and includes a feedback conductor 74 connected between output cores 203 and 204, and core A205, and the output of core A205 is connected by feedback conductor 76 to the input winding of core A201 and the inhibit winding of core A199 of the adder. The inhibit winding 78 of core A205 is connected to the output of core A208 such that the $2^3$ inhibiting signals applied to core A208 from core A229 in the timer kills the 8's in the adder output before it is fed back to the adder input. In this manner, the adder summation is reduced mod 8 even though the weight count of the input words is reduced mod 9.

While it will be appreciated by those skilled in the art that any serial adder suitable for summing the information and weight count bits may be utilized in the instant invention, advantageously, the adder may take the form shown in FIGURE 2 and described in greater detail in my co-pending application, Serial No. 700,124, filed December 2, 1957.

Figure 3:
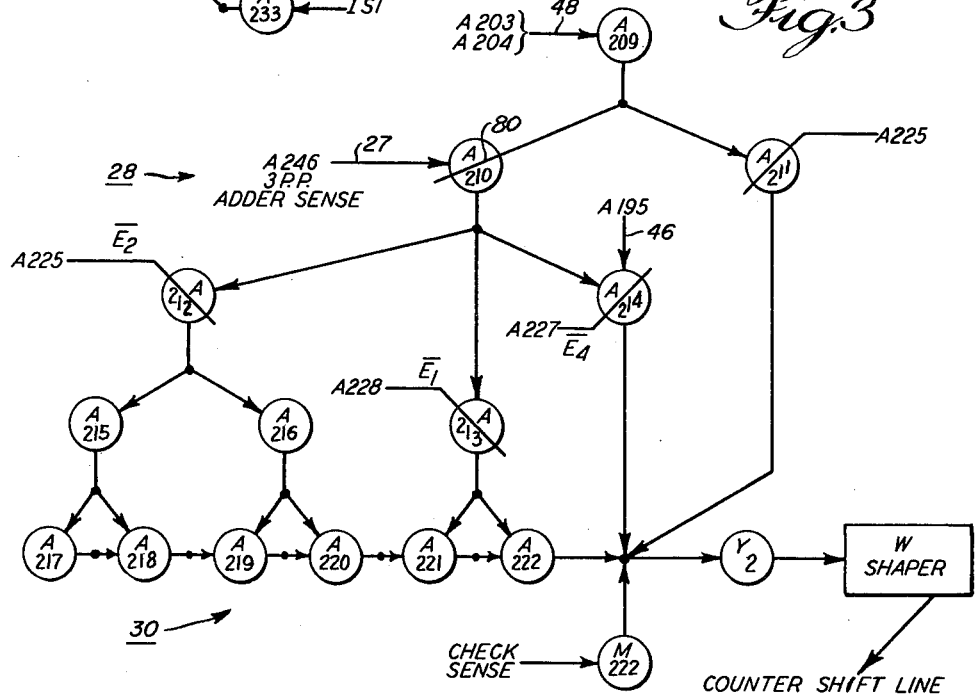
FIGURE 3 is a logical schematic diagram of an adder-to-counter converter and counter shift control circuit suitable for use in the system shown in FIGURE 1.

In accordance with the invention, each time an 8 is killed in core A196 at the adder input, or in core A205 at the adder output, a signal recording this kill is fed into the adder-to-counter converter 28, shown in greater detail in FIGURE 3. Thus, output cores A203 and A204 of the adder 20 are connected to core A209 of the adder-to-counter converter, by means of conductor 48, and input core A195 connected to the adder input is connected to core A214 in the adder-to-counter converter, by means of conductor 46. Accordingly, the input to core A209 will be in accordance with the number of 8 kills at the adder output while the input to core A214 will be in accordance with the 8 kills at the adder input.

Each time a bit signifying an 8 kill is received by the adder-to-counter converter 28, this bit is propagated down the adder-to-counter converter to a core $Y_2$ to provide a signal for the W shaper which advantageously may be any suitable pulse shaper used to produce shift pulses for the core shift register counter shown in FIGURE 4. Consequently, for each particular 8 kill, the W shaper applies a shift pulse to the shift line (not shown) associated with the shift register cores W1 through W9 of the counter to shift the bit inserted into the counter one core position. This shifting of the bit in the counter is continuous with one shift for each 8 killed on the input to the adder or on the output of the adder.

After the information has been processed through the adder 20, it is necessary to sense the remainder in the adder and this sensing is initiated by the adder sense circuit 42, shown in greater detail in FIGURE 5. The adder sense circuit comprises a core M216 to which are applied pulses $EW_1$ and $EW_9$ identifying the end of words one and nine, respectively. The output of core M216 and the output of a ones generator core A247 are fed through A223 and core D124 to the inhibit winding 90 of core D121 to block the pulses applied to the latter from a ones generator by way of the pulse line 92. The output of core D121 is applied over line 94 to signify the negation of the end of words one and nine, $\overline{EW_1}$ v. $\overline{EW_9}$, and to the inhibit winding 96 of core A243.

The transfer weight count monitor bit which was dropped into cores D126 and D120 consequently is inhibited from passing through core A243 whenever an $\overline{EW_1}$ v. $\overline{EW_9}$ signal is applied to inhibit winding 96 of core A243. Thus, the output of core A243 is in the form of three pulses which are applied through the cores A245 and A246 to the adder sense line 27, and through core A255 to the adder reset line 25. In this manner the adder sense circuit generates three pulses on its output core A246 when it is desired to feed the information from the adder to the adder-to-counter converter. Core A246 therefore is connected to A210 in the adder-to-counter converter in FIGURE 3 and the inhibit winding 80 on the core A210 is connected to the output of the core A209. The adder contains a maximum of four bit positions, with only three of such bit positions used when a one is present in any of the weighted positions $2^0$, $2^1$, and $2^2$. The application of these pulses on the inhibit winding 80 of core 210 produces at the output of this core the 7's complement of the result in the adder.

The output of core A210 in the adder-to-counter converter of FIGURE 3 is gated in accordance with its weight into one of the three cores A212, A213, and A214 connected to output of core A210. Thus, if the weight of the complement of the adder result is equal to 1, it will be inserted into the core A214 since the $\overline{E_2}$ and $\overline{E_1}$ signals from cores A225 and A228 respectively are applied to inhibit cores A212 and A213. In a similar manner, if the weight of the complement of the adder result is equal to 2, it will be inserted into the core A213, and if the weight of the complement of the adder result is equal to 4, it will be inserted into the core A212. In each case, the remaining two cores will be inhibited by blocking signals from the timer circuit.

It will be noted that the output of core A214 is connected directly to the core $Y_2$, that the output of core A213 is connected in parallel to cores A221 and A222, and that the output of core A212 is connected through cores A215 and A216 in parallel to the cores A217, A218, A219 and A220. Consequently, there will appear at the input of the core $Y_2$ and the W shaper, a group of pulses indicative of the actual number of shift pulses which should be produced by the W shaper to drive the transfer counter 32.

Accordingly, the monitor bit in counter 32 is shifted a number of pulse positions corresponding to the number of pulses at the output of the W shaper—a number equal to the total number of 8's cast out or killed plus the 7's complement of the adder result, which is the correction factor in converting from mod 9 to a simulated mod 9. If a transfer has been made without error, the monitor bit inserted in counter 32 will have been shifted into the core W8. It is a feature of this invention that the monitor bit comes to rest in the core W8 whether there has been 8 words processed or 7 words processed, so that the presence of the monitored bit in this position serves as an indication of an errorless transfer. Thus, if the monitor bit comes to rest in any of the other cores in the counter 32, an error in transfer of the information is indicated.

The transfer weight count is checked by applying a check sense pulse to the core M222 in the shift pulse generator 30 shown in FIGURE 3, and this check sense pulse is transmitted through core $Y_2$ and the W shaper to shift the monitor bit in counter circuit 32 one core position. Thus, if the bit had been residing in core W8, the check sense pulse will shift the bit from the core which is the logical equivalent of core W8, into the core A230 and a subsequent shift will result in the bit in the core A230 being applied to the inhibit winding 82 of core A231. At this time, a check sense pulse is applied to the core A231 and if a bit is applied to inhibit winding 82 from core A230, the check sense pulse will be prevented from being dropped into the core $Y_3$, and therefore, from being applied to the thyratron relay TR224. If a check pulse should get through core A231 and into core $Y_3$, the firing of the thyratron relay, TR224 would indicate an error and the apparatus would be stopped.

It will be noted that the check circuit comprising cores A230, A231 and $Y_3$ is substantially duplicated by corresponding cores A239, A240 and A241 respectively, so that a master check of the check is obtained. The provision of both a check and a master check circuit serves as a check on the check circuit itself to the end that a fault in the check circuit can be detected before an error in information transfer can be processed through the machine. Further, it should be noted that the check sense pulse is applied to the inhibit winding 84 of core W9 in counter 32 to reset the counter.

The zero transfer weight count check pulse applied to core $Y_3$ is a signal which checks to see whether or not a valid information weight count is being transferred. It will be appreciated by those skilled in the art that some differentiation must be made between a series of valid zeros in a machine word and a series of invalid zeros which may have resulted from some error in machine operation. As pointed out above a series of valid zeros is always accompanied by a weight count of 9 and this condition is checked by the zero check pulse applied to the core $Y_3$. If an invalid zero is present, the thyratron relay TR224 will fire to indicate this error.

The manner in which the presence of a valid weight count is checked will be further understood by reference to FIGURE 4 and the manner in which the zero TWC check signal is produced. The circuit includes a gate core A190 which is normally closed due to the fact that there will be a series of ones applied to the inhibit winding by way of the ones generator and core A191. The latter core A191 has an inhibit line which will be activated at time T9 in each timing cycle and consequently once every timing cycle the core A191 will not produce an output for application to the inhibit line on the core A190. Feeding through the core A190 is a magnetic core flip-flop A189 and this flip-flop will be set by an $IS_1$ signal or by an end word signal for each word processed other than words 1 or 9. The signals will be applied by way of cores M207 and A132 to the core A187. The signal from the core A187 will set the flip-flop A189 prior to the time that a weight count for a word being processed is applied to the circuit. If the weight count is a valid one and has a one somewhere therein, the flip-flop A189 will be reset. Thus, at the instant that the gate A190 is open, no signal will be passed therethrough from the core A189. However, if the weight count associated with the word should not have any ones therein, the flip-flop which includes the core A189 would not be reset and consequently, the ones stored therein will be shifted out into the core A190 when this core has been conditioned to be open by no signal on the inhibit line thereof and a signal may be then shifted into the core $Y_3$. With a signal in the core $Y_3$, the thyratron relay TR224 will be activated.

Thus, there has been shown and described a novel transfer weight count circuit which serves to check the validity of the information transferred by summing the weighted values of each bit transferred and the negation of the weight count to produce a constant. The weight count circuits of the invention are characterized by their unique ability to operate with a modulo other than a modulo of the weight count carried with the information, as described specifically above. This advantageous result is achieved by casting out the bits in certain pulse positions and by relating the number of bits cast out to produce a predetermined number of sequential shift pulses. These shift pulses are utilized to move a monitor bit in a counter to indicate the presence or absence of an error in the information transfer.

The principles of the present invention are equally applicable to other types of circuits particularly where weight counts are to be associated with certain information. Thus, there is illustrated in FIGURES 7 through 10 the basic principles of the invention applied to a circuit for generating a weight count to be associated with information being processed. The information or machine words used in apparatus illustrated in FIGURES 1 through 6 must be supplied by some appropriate information source. Generally, the information source is so arranged that as the information is supplied, a weight count will be appended thereto for later use in transfer checking circuitry and the like.

As will be more fully described below, the forty-eight information bits which constitute the information in each machine word are examined and a weight count is produced and appended to the information. The generation of the weight count in the hereinafter described form of the invention comprises reducing the information supplied mod 8 and keeping track of the number of times that the information has been reduced mod 8. Further, an adder circuit is provided which is also opearting mod 8. Any reduction mod 8 in the adder is likewise counted for use in the generation of the weight count. A further function is performed in conjunction with the adder in that after the information has been applied thereto, the remainder is fed out of the adder as the 7's complement thereof. The number of times the adder and the information have been reduced mod 8 and the 7's complement in the remainder in the adder are used to control a shaper which supplies shift signals to a counter. This counter will in turn provide pulses which may be appropriately gated into a 4 bit serial register which will be, at the completion of the word, the mod 9 weight count of the information or machine word which has been examined.

FIGURE 7 illustrates the circuitry used for generating the timing or shift pulses used for generating a weight count of the information applied to the input. The circuitry herein includes an adder circuit which is substantially the same as that illustrated in FIGURE 2 and in addition includes output circuitry for complementing the remainder in the adder when the final weight count is to be produced.

FIGURE 8 illustrates timing and conversion circuitry used to convert the adder remainder and the mod 8 reduction or kills into a four bit binary coded decimal number which will be the weight count of the information applied to the input of FIGURE 7 and be a number which is the information reduced mod 9.

FIGURE 9 illustrates circuitry used for the supplying of the set and reset signals for the conversion circuit of FIGURE 8. The circuit of FIGURE 10 supplies the control signals for the adder circuitry of FIGURE 7.

Considering FIGURE 10 more specifically, the circuitry illustrated in this figure receives an input signal which is related to the number of information bits to be transferred and used in conjunction with the generation of a weight count. In one preferred embodiment of the invention, the number of information bits handled for each weight count was forty-eight. Consequently, a timer, not shown, associated with this circuit is arranged to produce forty-eight timing pulses for the information transferred and an additional four timing pulses for the weight count. Further, it is sometimes desired that an additional timing pulse be provided, the latter being related to the adding of a complement signal which may or may not be used in the handling of the information.

At time T14, a timing signal is applied to the core A181 in FIGURE 10, and this signal at the time of the next timing pulse is shifted into the cores A170 and A169. A signal is also applied to the inhibit line on a further core A183. This latter core has, on the input thereof, a ones generator.

Upon the occurrence of the next shift on the A cores, the signal in the core A169 will be transferred into each of the cores A171, A173 and A174. The signal from the core A170 will be applied to the inhibit winding of the core A172. This will mean that a one will be written into each of the cores A171, A173 and A174 and a zero will be written into the core A172. These signals that are stored in this register will be recirculated as the information is being transferred into the circuit of FIGURE 7 and will supply the necessary gating signals for killing selected signals in the information transferred. In addition, the signals circulating in the cores A171—A174 will be applied to the inhibit line of the core A175 to produce the gating signal $E_1$ also utilized in FIGURE 7. It will be apparent that this signal $E_1$ will appear once in every four timing pulses from this circuit.

Considering FIGURE 9 more specifically, the input to the circuit is a timing pulse T22 which is applied to the input core A176. This core is shifted and the signals are applied to the cores A177, A178 and A182. The core A178 has an inhibit line thereon which is connected to a suitable signal source, not shown, which will inhibit the writing of a signal in the core during the first timing cycle. This is for the reason that the signal should not be passed therethrough to the output sense cores W13–1 and W14–1 until information has been supplied to the circuitry of FIGURE 7. This will be understood when it is noted that the weight count of each machine word or group of information bits is placed at the beginning of the word after it is generated. Thus, at the time the first information is transferred into the weight generating circuits, there will be no valid information in the circuits for which a sensing should be made.

The signals applied to the core A177 will be shifted into the cores W10–1, W11–1 and W12–1. The core W12–1 will not have a signal shifted thereto if the inhibit line thereon has a signal applied thereto. The inhibit line for the core W12–1 is energized by way of the core A182, the latter having an inhibit line which may also have a timing pulse applied thereto at the end of each processing cycle to prevent the core A182 from receiving a pulse from the core A176. This will have the effect of eliminating the possibility of a signal being written into the timing ring core W18 at the same time that it is desired to reset the core. Each of the cores W10–1 through W15–1 are connected to appropriate control lines associated with the main counter and converter circuitry of FIGURE 8.

Referring next to FIGURE 8, it will be seen that this circuit comprises a ring type counter which includes a series of cores W16—W20 and W37—W40. It will be noted that these cores each have an inhibit line which is directly associated with the outputs of the cores W10—W15 of the circuits of FIGURE 9. By way of the circuits of FIGURE 9, at the start of a processing cycle, a one will be written into the core W18 and each of the other cores will be reset.

The counter ring of FIGURE 8 has a series of output cores identified as cores W1-1 through W9-1. These cores in turn feed a series of set-up cores A58—A64. Each of these set-up cores are normally gated off by sense signals supplied thereto from the circuitry of FIGURE 9. However, when the sense signals are not present, on the inhibit windings, the signals which may have been written into the cores A158—A164 may be written into the output register cores A165—A168. At the end of the process cycle for each word or forty-eight bits of information, there will be residing in the register, including cores A165—A168, a four bit weight count which may be suitably associated with the information that is being handled.

The shift pulses for the timing ring of FIGURE 8 are derived from the W shaper illustrated in FIGURE 7 and are applied to the shift line (not shown) normally associated with the timing ring in the manner well understood by those skilled in the art.

Referring more specifically to the detailed logical circuitry of FIGURE 7, the information for which it is desired to generate a weight count will be applied to the input core A130 and the timing of this input is so arranged that the first bit, or $2^0$ bit, is read into core A130 at time T16. The information then begins to shift in by way of the core A135 and then to the inhibit winding on the core A136. The core A136 has a further input, a signal from a ones generator. This portion of the circuit and the further portion identified by the cores A137—A146 corresponds to the adder circuit 20 illustrated in FIGURE 2.

It will be noted that the core A135, on the input to the adder, has an $E_1$ signal applied to the inhibit winding thereon. This signal is arranged to kill the $2^3$ bit in each combination of four bits applied to the core by way of the input core A130. In addition, the $2^3$ bit carry in the adder, which is normally fed by way of the core A146 back to the input, will be killed by the $E_1$ signal being applied to core 146 by way of core A145.

The $\overline{E_1}$ signal derived from the circuitry of FIGURE 10 is applied to the inhibit winding of a further core A131. This core will then pass the $2^3$ bits on the input. The signal on the output of this core will be fed to the W shaper to create a shift pulse for each $2^3$ bit that may have been killed on the input of the adder. When the first four bits are being fed into the circuitry of FIGURE 7, an inhibit signal will be present on the core A134 and this inhibit signal will prevent the first $2^3$ bit from being read into the core A134. In this case, however, the signal will be read into the core A132 and from there to the core A133 and to core A153. The signal is then shifted by way of core A155 and core $Y_3$ to the W shaper on the output of the circuit. The reason for this bypass is that it includes three additional pulse periods of delay which will prevent the first kill 8 on a new word from being fed into the W shaper prior to the time that the previous word has been cleared out and the weight count therefore sensed. After this first bypass, the inhibit line on the core A134 will be inactive and the next kill 8 may be fed directly through the core $Y_1$ to the W shaper.

It will be apparent that insofar as this circuit has been thus described, the W shaper on the output will be producing a shift pulse for the W cores in FIGURE 8 each time that there is a $2^3$ bit present in the information applied to the input core A130. It will further be apparent that the remainder of the bits of each four bit combination will be added in the adder circuit. The 8's that are killed in the adder circuit by way of the core A146 are gated by way of the core A147 and A148 to the core $Y_1$ and from there they are applied to the W shaper to produce an additional shift pulse for each of the 8's killed within the adder.

After forty-eight information bits have been processed within the adder, the remainder in the adder is shifted out and the 7's complement is produced. The manner in which the 7's complement is produced will be understood by noting that the core A156 is a ones generator which, at time T13, will be set. This core will apply a series of ones to the core A157 to the core $Y_2$. Whether or not a signal can be read into the core $Y_2$ will depend upon whether or not information is being shifted from the adder to the inhibit line on the core $Y_2$. If a $2^0$ bit should be stored in the adder, it is desired to produce a total of six pulses for driving the W shaper. The remainder from the adder will be shifted by way of the core A154 and core A180 to the core $Y_3$ and the inhibit line on the core $Y_2$. This will close the core $Y_2$ so that the ones fed thereto by way of the core A157 will be blocked and prevented from feeding to the W shaper. Inasmuch as a single pulse will be applied to the core $Y_2$ at the same time that an inhibit pulse is applied to the core $Y_3$, from the core A157, the W shaper will not receive an input signal. As soon as the $2^0$ bit has been sensed, the $Y_2$ core will have a series of ones applied thereto and, if there is no other bit stored in the adder, the number of ones passing through the core $Y_2$ to the W shaper will be 6, this being the 7's complement of the one bit which was in the adder. The W shaper will then shift the counter ring of FIGURE 8 in accordance with the particular number of shift pulses.

When a $2^1$ bit is in the adder, the core A152 will be gated to pass this bit and the core A153 and A155 will function to provide two inhibit signals to the core $Y_2$. This will mean, in the absence of any other bits being stored in the adder, that there will be five shift signals produced by the output W shaper.

In a similar manner, the $2^2$ bit, if present, will be applied by way of the core A149 to set a ones generator involving the core A150. This circuit will produce a total of four pulses which will be applied by way of the cores A153 and A155 to the cores $Y_2$ and $Y_3$. In this case, three output W shaper pulses will be produced providing the $2^2$ bit is the only one that remains in the adder.

It will be apparent that various combinations of bits in the adder will act to control the number of shifts of the W shaper and the 7's complement of the remainder will always be produced in this output.

After the information has been processed, two additional shift pulses are applied by way of the core A156, the latter not being gated off until time T23. These two additional shift pulses are the sense shift pulses which provide the final shifting signal required in the counter and conversion circuitry of FIGURE 8.

The circuitry of FIGURE 8 will have the timing bit first inserted in core W18 shifted to a position in the ring such that it will represent the weight count to be produced and set up in the output register comprising the cores A165—A168. For example, if the weight count should be a binary coded decimal 5, at the end of the information processed, the timing bit will reside in the core W20. The two shift pulses used for sensing will cause this signal to be shifted first into the core W5-1 and then to the cores A161 and A162. Upon the next A core shift, the signals will be read from the core A161 into the core A168 and from the core A162 into the core A166. This will mean that the core A168 will have a $2^0$ bit stored therein and the core A166 will have a $2^2$ bit stored therein. This will be a binary coded decimal 5 representing the weight count of the information. Since the timing ring or counter ring of FIGURE 8 is a 9 pulse period ring, the weight count produced in the output cores, as determined by the conversion circuits, will be a mod 9 weight count.

It will thus be apparent from the circuitry of FIGURES 7 through 10 that the principles of the present invention are also well adapted for use in generating weight counts for information to be processed.

It will be understood by those skilled in the art that the circuits described above are merely illustrative of the

What I claim as my invention is:

1. A system for monitoring a circuit function in a data process machine comprising a register for receiving machine words formed of a plurality of information bits plus a weight count, said weight count representing the sum of said information bits in accordance with a prescribed column weighting scheme and reduced to a first modulo, said register further comprising means at its output for producing a complement of said weight count and a weight count adder circuit connected to said register for producing the sum of the machine words received therefrom in accordance with a prescribed column weighting scheme and reduced to a second modulo, said weight count adder circuit including means at its input and output for casting out bits from predetermined columns of said column weighted words.

2. A system for monitoring a circuit function in a data processing machine comprising a register for receiving machine words formed of a plurality of information bits plus a weight count, said weight count representing the sum of said information bits in accordance with a prescribed column weighting scheme and reduced modulo 9, said register further comprising means at its output for producing the 15's complement of said weight count and a weight count adder circuit connected to said register for producing the sum of the machine words received therefrom in accordance with a prescribed column weighting scheme and reduced modulo 8, said weight count adder including means at its input and output for casting out bits from the $2^3$ columns of said column weighted words.

3. A system for monitoring the accuracy of a circuit function in a data processing machine comprising a register for receiving machine words formed of a plurality of informatioin bits plus a weight count, said weight count representing the sum of said information bits in accordance with a prescribed column weighting scheme and reduced to a first modulo, said register further comprising means at its output for producing a complement of said weight count, a weight count adder connected to said register for producing a sum of the machine words received therefrom in accordance with a prescribed column weighting scheme and reduced to a second modulo, said weight count adder including means to its input and output for casting out bits from predetermined columns of said column weighted words, and check means connected to the output of said weight count adder for producing a check signal to indicate an accurate circuit function or an error signal to indicate an erroneous circuit function.

4. A system for monitoring the accuracy of a circuit function in a data processing machine comprising a register for receiving machine words formed of a plurality of information bits plus a weight count, said weight count representing the sum of said information bits in accordance with a prescribed column weighting scheme and reduced to a first modulo, said register further comprising means at its output for producing a complement of said weight count, a weight count adder connected to said register for producing the sum of the machine words received therefrom in accordance with a perscribed column weighting scheme and reduced to a second modulo, said weight count adder including means to its input and output for casting out bits from predetermined columns of said column weighted words, a shift pulse generator, and means connected to said shift pulse generator for applying thereto data representative of the weight count output of said adder and the number of cast-out bits to cause said shift pulse generator to produce a number of shift pulses equal to a predetermined value only when there is an absence of an error in the operation of the data processing machine.

5. A system for monitoring the accuracy of a circuit function in a data processing machine comprising a register for receiving machine words formed of a plurality of information bits plus a weight count, said weight count representing the sum of said information bits in accordance with a prescribed column weighting scheme and reduced to a first modulo, said register further comprising means at its output for producing a complement of said weight count, a weight count adder connected to said register for producing the sum of the machine words received therefrom in accordance with a prescribed column weighting scheme and reduced to a second modulo, said weight count adder including means to its input and output for casting out bits from predetermined columns of said column weighted words, a counter having a plurality of stages, means for presetting a bit in a selected one of said stages, a shift pulse generator connected to said counter for shifting the bit in said counter to different ones of said stages, and means for applying to said shift pulse generator data representative of the weight count output of said adder and the number of cast-out bits to cause said shift pulse generator to produce a number of shift pulses for shifting the bit in said counter to a position indicative of the presence or absence of an error in the operation of the data processing machine.

6. An electrical circuit controller for monitoring the accuracy of a circuit function in a data processing machine comprising a register for receiving machine words each formed of a plurality of information bits plus a weight count, said weight count representing the sum of said information bits in accordance with a prescribed column weighting scheme and reduced to a first modulo, a weight count adder operating with a second modulo, means for applying the machine words from said register to said weight count adder including means for complementing said weight count and for casting out bits in predetermined columns of the complemented weight count, means connected to the output of said weight count adder for casting out bits in the predetermined columns of the sum provided by said adder, a counter having a plurality of stages, means for presetting a bit in a selected one of said stages, a shift pulse generator connected to said counter for causing the bit preset therein to be shifted to a different one of said stages to indicate presence or absence of an error in the circuit function, and input circuit means connected to said shift pulse generator for applying to the latter the complement of the output sum from said adder plus a count equal to the number of bits cast out at the input and the output of said adder.

7. An electrical circuit controller for monitoring the accuracy of a circuit function in a data processing machine comprising a register for receiving machine words each formed of a plurality of information bits plus a weight count, said weight count representing the sum of said information bits in accordance with a prescribed column weighting scheme and reduced to a first modulo, a weight count adder operating with a second modulo, means for applying the machine words from said register to said weight count adder including means for complementing said weight count and for casting out bits in predetermined columns of the complemented weight count and of said information bits, means connected to the output of said weight count adder for casting out bits in the predetermined columns of the sum provided by said adder, a counter having a plurality of states, means for presetting a bit in a selected one of said stages, and input circuit means connected to the output of said adder for applying to the counter the complement of the output sum from said adder plus a count equal to the number of bits cast out at the input and the output of said adder to shift the preset bit in the counter a predetermined number of stages when a circuit function is carried out without error.

8. An electrical circuit controller for monitoring the accuracy of a circuit function utilizing machine words formed of a plurality of information bits plus a weight count reduced to a first modulo comprising a weight count adder operating with a second modulo, means for applying the machine words to said weight count adder including means for complementing said weight count and for casting out bits in predetermined columns of the complemented weight count and the uncomplemented information bits, means connected to the output of said weight count adder for casting out bits in the predetermined columns of the sum provided by said adder, and output means connected to said adder for indicating the presence or absence of an error in the circuit function as determined by the complement of the output sum from said adder plus a count equal to the number of bits cast out at the input and the output of said adder.

9. An electrical circuit controller for monitoring the accuracy of a circuit function comprising a register for receiving machine words each formed of a plurality of information bits plus a weight count reduced to a first modulo, said register further comprising means at its output for producing a complement of said weight count, means for applying the machine words to a weight count adder operating with a second modulo, means connected to the input and to the output of said weight count adder for casting out bits in the predetermined columns of the words present at said input and said output, and means connected to said adder for indicating the presence or absence of an error in the circuit function by receiving therefrom the complement of the output sum from said adder plus a count equal to the number of bits cast out at the input and the output of said adder.

10. An electrical circuit controller for monitoring the accuracy of a circuit function comprising a register for receiving machine words each formed of a plurality of information bits plus a weight count reduced modulo 9, means for producing the 15's complement of said weight count and for applying the resulting machine words to a weight count adder operating modulo 8, and means connected to the input and to the output of said weight count adder for casting out bits in the $2^3$ columns of the words present at said input and said output, and means connected to the output of the adder for indicating the presence or absence of an error in the circuit function in accordance with the output sum from said adder plus a count equal to the total number of $2^3$ bits cast out at the input and the output of said adder.

11. A circuit controller for monitoring the accuracy of a circuit function in a data processing machine comprising a register for receiving machine words each formed of a plurality of information bits plus a weight count, said weight count representing the sum of said information bits in accordance with a prescribed column weighting scheme and reduced modulo 9, a weight count adder operating modulo 8, means for applying the machine words from said register to said weight count adder including means for complementing said weight count and for casting out bits in the $2^3$ columns of the complemented weight count and the information bits, means connected to the output of said weight count adder for casting out bits in the $2^3$ columns of the sum provided by said adder, complementing means at the output of said weight count adder for complementing the sum provided by said adder, and means connected to the output of said complementing means and to said weight count adder for receiving the complement of the output sum from said complementing means plus a count equal to the number of $2^3$ bits cast out at the input and the output of said adder to indicate the presence or absence of an error in the circuit function.

12. Means for monitoring the accuracy of a circuit function in a data processing machine comprising a register for receiving machine words formed of a plurality of bits including a weight count in a first notation, a weight count adder, means for applying the machine words from said register to said weight count adder including means for converting said bits to a second notation at the input of said adder, means connected to the output of said adder for converting the sum to said second notation, a counter having a plurality of stages and including means for presetting a bit in a selected one of said stages, and control means connected to the output of said adder for causing the bit preset in the counter to be shifted to a different one of said stages to indicate presence or absence of an error in the circuit function.

13. Means for monitoring the accuracy of a circuit function in a data processing machine comprising a register for receiving machine words formed of a plurality of information bits plus a weight count reduced to a first modulo, a weight count adder operating with a second modulo, means for applying the machine words from said register to said weight count adder including means for complementing said weight count and for reducing said information bits and said complemented weight count to said second modulo, means connected to said weight count adder for reducing its output sum to said second modulo, a counter having a plurality of stages and including means for presetting a bit in a selected one of said stages, a shift pulse generator connected to said counter for causing the bit preset therein to be shifted to a different one of said stages to indicate presence or absence of an error in the circuit function, an input circuit means for applying to said shift pulse generator the complement of the output sum from said adder plus a count determined by the reduction of the bits at the input and output of said adder to said second modulo.

14. In the electrical circuit controller for a data processing machine adapted to monitor the accuracy of a circuit function comprising a register for receiving machine words each formed of a plurality of information bits plus a weight count, said weight count representing the sum of said information bits in accordance with a prescribed column weighting scheme and reduced to a first modulo, a weight count adder operating with a second modulo, means for applying the machine words from said register together with a complement of said weight count to said weight count adder, and means connected to said weight count adder for indicating the presence or absence of an error in the circuit function, including means for adjusting the input information to said last named means to correct for the differences between said first and second modulos.

15. Means for monitoring the accuracy of a circuit function in a data processing machine comprising a weight count adder for receiving a machine word formed of a plurality of bits including information bits plus complemented weight count bits, means for reducing said machine word to a first modulo at the input of said adder by casting out selected ones of said bits, means for applying the reduced machine word to said weight count adder, means for reducing the adder sum to said first modulo by casting out selected bits from the output of said adder to produce a modified sum, means for complementing said modified sum, and a control circuit connected to said weight count adder for receiving pulses representative of the number of bits cast out at the input of said adder, the number of bits cast out at the output of said adder, and the complement of said modified sum to produce a weight count reduced to a modulo different from said first modulo.

16. Means for monitoring the accuracy of a circuit function in a data processing machine in accordance with claim 15 wherein the machine word at the adder input is reduced mod 8, the sum at the adder output is reduced mod 8, the modified sum in the adder is converted to its 7's complement, and the weight count produced is reduced mod 9.

17. An electrical circuit controller for monitoring a circuit function comprising a weight count adder for receiving a machine word formed of a plurality of information bits together with complemented weight count bits, means for reducing the machine word at the input to the adder to a first modulo, means for reducing the output of said adder to said first modulo, means for complementing the remainder in said adder, and means responsive to the number of reductions at the input and output of said adder and to the complemented remainder for producing a weight count reduced to a second modulo for said machine word.

18. Data handling apparatus for processing machine words of the type formed of a plurality of information bits comprising a weight count adder means for applying each machine word to said weight count adder and for casting out selected bits from said machine word at the input of said adder, means for casting out selected bits from the adder output, means for complementing the remainder in said adder, and a shift pulse generator connected to the adder output for producing a number of shift pulses in accordance with the number of bits cast out at the adder input and output and the number of bits in the complemented remainder of said adder.

19. Data handling apparatus comprising a source of machine words, each formed of a plurality of information bits plus complemented weight count bits, a weight count adder, means for applying each information word to said weight count adder, means for casting out selected information bits at the input and at the output of said adder, and means for counting the number of bits thus cast out to control the generation of a plurality of shift pulses.

20. Data transfer checking apparatus for digital words, each such word being formed of a plurality of information bits plus weight count bits generated from said information bits in accordance with a first value notation, comprising means for complementing said weight count bits, an adder circuit operating in accordance with a second value notation, means connecting said information bits and said complemented weight count bits to be summed in said adder circuit according to said second value notation, and checking means for checking the accuracy of the data transfer connected to said adder.

References Cited in the file of this patent

UNITED STATES PATENTS

| | | |
|---|---|---|
| 2,826,359 | Deerhake et al. | Mar. 11, 1958 |
| 2,837,278 | Scheiner et al. | June 3, 1958 |
| 2,850,234 | Bartelt et al. | Sept. 2, 1958 |
| 2,854,653 | Lubkin | Sept. 30, 1958 |
| 2,861,744 | Schmitt et al. | Nov. 25, 1958 |
| 2,875,951 | Schreiner | Mar. 3, 1959 |
| 2,955,756 | Jensen | Oct. 11, 1960 |